United States Patent [19]

Kim

[11] Patent Number: 4,958,831
[45] Date of Patent: * Sep. 25, 1990

[54] STATIONARY EXERCISING BICYCLE APPARATUS

[76] Inventor: Sang-Sup Kim, 178 E. Columbia, Des Plaines, Ill. 60016

[*] Notice: The portion of the term of this patent subsequent to May 15, 2007 has been disclaimed.

[21] Appl. No.: 344,015

[22] Filed: Apr. 26, 1989

Related U.S. Application Data

[63] Continuation of Ser. No. 56,856, Jun. 1, 1987, Pat. No. 4,925,183.

[51] Int. Cl.⁵ .............................................. A63B 21/00
[52] U.S. Cl. ......................................... 272/73; 434/61
[58] Field of Search ............................. 272/73; 434/61

[56] References Cited

U.S. PATENT DOCUMENTS

| | | | |
|---|---|---|---|
| 2,623,302 | 12/1952 | Shields | 272/73 |
| 3,432,164 | 3/1969 | Deeks | 272/73 |
| 4,212,480 | 7/1980 | Mikina et al. | 272/73 |
| 4,441,705 | 4/1984 | Brown | 272/73 |
| 4,580,983 | 4/1986 | Cassini et al. | 272/73 |
| 4,743,012 | 5/1988 | Kim | 434/61 |

FOREIGN PATENT DOCUMENTS

| | | | |
|---|---|---|---|
| 0121186 | 10/1984 | European Pat. Off. | 272/73 |
| 2950605 | 6/1981 | Fed. Rep. of Germany | 272/73 |
| 0475207 | 8/1937 | United Kingdom | 272/73 |

Primary Examiner—Stephen R. Crow
Attorney, Agent, or Firm—Charles F. Lind

[57] ABSTRACT

The disclosed stationary exercise bicycle apparatus has a bike unit, a road device unit, and a motion coordinator coupling said bike unit relative to the road device unit. The bike unit has a single wheel supported on and vertically over a non-powered substantially free-wheeling rotatable member of the road unit, and is frictionally coupled to roll on this rotatable member; and the motion coordinator pivots the bike unit frame relative to the road device at a location rearwardly spaced both from the bike unit seat and from the contact region between the wheel and rotatable member. The wheel thus transmits a force against the rotatable member that is related to the rider's weight and to the moment arm distances between the pivot mounting, seat and the contact region, making the degree of difficulty in manually pedaling the wheel automatically responsive to the rider's weight; and whereby the wheel rolling against the rotatable member transmits feedback vibrations to the seat. The pivot mounting may have alternative operative positions to change the moment arm distances for selectively increasing or decreasing the wheel force against the rotatable member. The seat may be adjusted to be forwardly of the contact region from the pivot mounting, thereby providing magnified wheel forces against the rotatable member greater than the rider's weight.

13 Claims, 2 Drawing Sheets

STATIONARY EXERCISING BICYCLE APPARATUS

RELATED APPLICATION

This application is a continuation of my copending application filed Jun. 1, 1987 having Ser. No. 07/056,856; issued on May 15, 1990 as U.S. Pat. No. 4,925,183, and entitled Indoor-Rollbike Apparatus.

BACKGROUND OF INVENTION

1. Field of Invention

The present invention relates to an exercising apparatus, and more particularly, to a stationary exercising bicycle unit that is pedaled by the rider.

2. Description of the Prior Art

Heretofore, stationary bicycle type exercising apparatus have had an elevated wheel means which was loaded by a drag/brake device to achieve a desired difficulty level of pedaling for rotating the wheel means. However, this type of prior art generates an unpleasant mood for exercising due to the lack of feedback from such an apparatus. Thus, the lack of realism reduces the interest of or likely time spent in exercising on such an apparatus.

On the other hand, the present invention consists of a wheeled means loaded directly with the rider's weight on it, and eliminates the need of the drag/brake devices of the prior art. Moreover, as the wheeled means rolls on a road device surface while carrying the rider, it generates the pleasant, natural bicycling feedback of road riding. Accordingly, the present invention eliminates many disadvantages of the prior art, while generating a pleasant bicycling exerciser at a stationary location.

No known bicycle type exercising apparatus has incorporated the important features of the present invention, which not only eliminates the physical wheel dragging and/or braking device, but that also eliminates the unpleasantness that comes from pedaling against the resisting means of the prior art, and that provides a positive and real feedback of a bicycle rolling on a road surface. This invention simulates the most important pleasant features of riding a bicycle, whose wheels are loaded with the riders weight, and thereby increases the likelihood of its regular use.

SUMMARY OF THE INVENTION

The invention relates to a stationary bicycling device which enables the rider to achieve results similar to riding an actual bicycle, complete with functional pedals for driving a wheel means loaded with the rider's weight as it rolls on a rotatable road means.

It follows that objects of the present invention are:

(1) to provide a novel and improved bicycling exercise apparatus that can be used to give many beneficial results and pleasures of riding an actual bicycle but which can be achieved at a stationary location;

(2) to provide an ideal all-weather exercising device, as a realistic alternative for cyclists who must continue bicycle training in inclement weather; and (3) to provide a suitable exercising apparatus to help keep athletes in condition.

With the foregoing and other objects in mind, my invention comprises constructions, combinations and arrangements of parts as hereinafter described and illustrated in the accompanying drawings.

DESCRIPTION OF THE PREFERRED EMBODIMENTS

Figure 1:
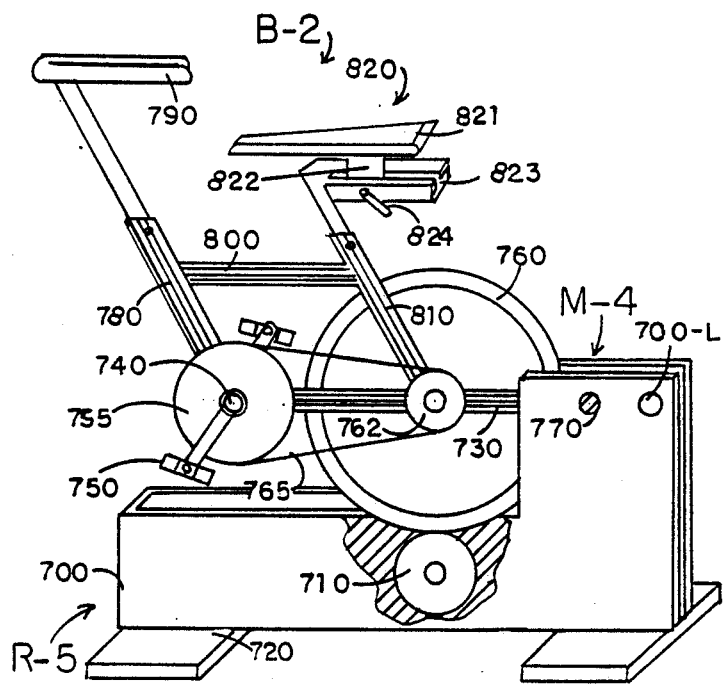
FIG. 1 is a left side perspective view of an indoor-rollbike apparatus constructed according to the principles of the invention.

The indoor-rollbike apparatus illustrated in FIG. 1 has bike unit B-2, road device unit R-5 and motion coordinator means M-4. The components of this indoor-rollbike apparatus will be represented by numbers starting from 700.

The road device unit R-5 has two substantially parallel L-shaped road frame members 700, each having an opening 700-H, and an axled rotating road means 710, preferably a flywheel, is mounted into the opening 700-H. The road frame members 700 are attached as by welding to transversal support members 720 respectively disposed near the front and rear portions of the road device unit R-5 to stabilize the road device unit.

Motion coordinator openings 700-L are provided at the top of the upstanding rear section of each road frame member 700 for providing a connection between the bike unit B-2 and the road device unit R-5.

Figure 5:
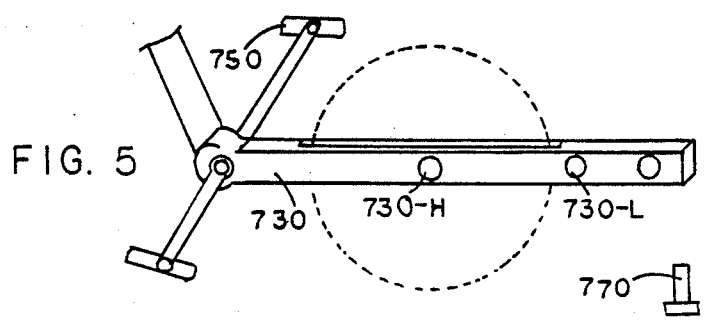
FIG. 5 is a perspective view illustrating cooperating parts of the bike unit B-2 used in FIG. 1.

The bike unit B-2 has a pair of longitudinally elongated main members 730. A pedal crank housing 740 is provided on the front end of the main members 730, and a pedal crank holding a pair of pedals 750 and a driving sprocket 755 is mounted to rotate in the pedal crank housing 740 as on a conventional bicycle. Near its middle each main member 730 has an opening 730-H, shown in FIG. 5; and an axled wheel member 760 having a driven sprocket 762 is mounted rotatably in place at the opening as on a conventional bicycle. A chain member 765 is placed around the driven sprocket 762 and the driving sprocket 755 to carry the rotational force from the pedals 750 to the wheel member 760. Openings 730-L at the rear end of each main member 730 provide for linking the bike unit B-2 to the road unit R-5, by an axle pin member 770 being inserted through these openings and the motion coordinator openings 700-L.

A head tube member 780 is connected to the pedal crank housing 740, and the head tube member 780 carries conventional handlebars 790. The top of the head tube member 780 is connected to an upper member 800 whose rear portion connects to an upper portion of a seat tube member 810. The lower portion of the seat tube member 810 is connected to the main member 730, and a seat assembly 820 is carried in the seat tube member 810.

Figure 2:
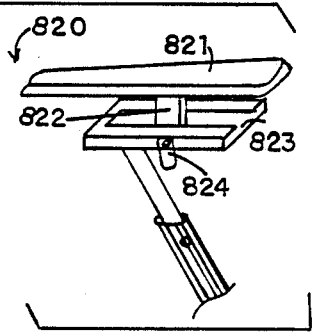
FIG. 2 is a fragmentary perspective view illustrating cooperating parts of the seat assembly 820 used in FIGS. 1 and 3, which allows the seat to be adjusted horizontally back and forth as well as vertically up and down.

As shown in FIG. 2, the seat assembly 820 can be raised and lowered as on conventional bicycles. A seat member 821, part of the seat assembly 820, has as at its lower portion a sliding member 822 which can fit onto rail member 823 such that the seat member 821 can slide back and forth along the rail member 823 without falling off. A locking member 824, preferably a threaded device, can be locked to keep the seat member 821 as adjusted, or can be released to adjust the seat position.

This indoor-rollbike apparatus carries the rider's weight upon the wheel member 760 which presses on the rotating road means 710. The transmitted force between the wheel member 760 and road means 710 with the same rider's weight can be adjusted by inserting the pin member 770 into different motion coordinator openings 700-L and corresponding axle pin member openings 730-L, to vary the moment arm distance from the wheel member 760 to the pin member 770, which acts as the fulcrum point. This also varies the difficulty level for pedaling. As there is no front wheel, the force the drive wheel 760 applies against the road means 710 can be magnified to exceed the rider's weight, depending on the moment arm locations of and distances between the seat assembly 820, the drive wheel road device contact area, and pin member 770.

In this particular indoor-rollbike apparatus, the pin member 770 and its fit in the openings 700-L and 730-L comprise the motion coordinator means M-4 between the bike unit B-2 road device unit R-5.

Figure 3:
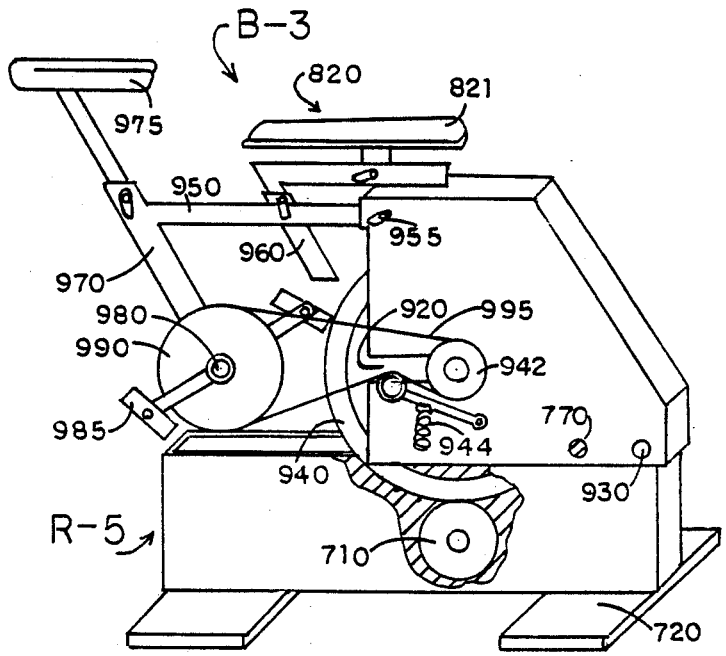
FIG. 3 is a left side perspective view of another indoor-rollbike apparatus constructed according to the principles of the invention.

FIG. 3 shows another indoor-rollbike apparatus, having bike unit B-3, road device unit R-5 and a motion coordinator means M-5. The different or additional components of this apparatus will be represented by numbers starting from 900.

Figure 6:
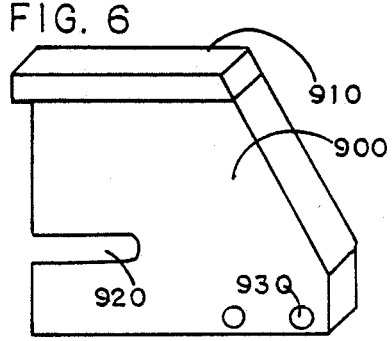
FIGS. 6 and 7 are perspective views illustrating cooperating parts of the bike unit B-3 used in the FIG. 3.
Figure 7:
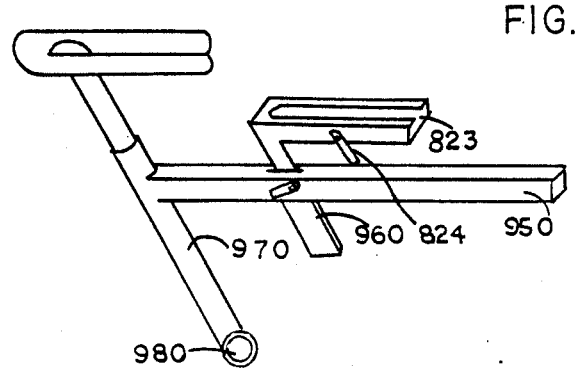

The bike unit B-3 has a pair of 4-sided wheel holding members 900. A horizontally aligned main support member 910, preferably having an opening of rectangular cross section, is firmly joined to the top of the wheel holding members 900, as by welding. As shown in FIG. 6, wheel catch slots 920 are at the lower front end of the wheel holding members 900, and axle pin member openings 930 are at the lower rear portion of each wheel holding member 900. An axled wheel member 940 with a driven sprocket member 942 and a spring loaded chain tension adjusting means 944, shown in FIG. 3, are also mounted on the wheel holding members 900. The wheel member 940 is vertically above and rests directly on the rotating road means 710 of the road device unit R-5. An upper member 950, preferably having a rectangular cross-section, is inserted into the opening of the main support member 910 and can slide in and out of the main support member 910 to adjusted position. The upper member 950 can be locked in any adjusted position by a main locking means 955, preferably in the form of a threaded member which can be tightened. A seat tube member 960 is firmly joined to the upper member 950 near where it is exposed beyond the main support member 910. The seat assembly 820 is mounted in the seat tube member 960 and can be raised and lowered vertically and adjusted horizontally as has already been noted.

The upper portion of a head tube member 970 is firmly attached to the front portion of the upper member 950, and handlebars 975 are attached to the head tube member 970. The bottom portion of the head tube member 970 forms a pedal crank housing 980, to which a pedal crank having pedals 985 and a driving sprocket 990 is rotatably mounted as on a conventional bicycle.

A conventional drive chain member 995 is placed around the driving sprocket 990, the driven sprocket 942 and the chain tension adjusting means 944 to transfer the pedaled force to the wheel member 940. The chain tension adjusting means 944 is used to keep the chain member 995 tight when the upper member 950 has been moved to any adjusted position.

Figure 4:
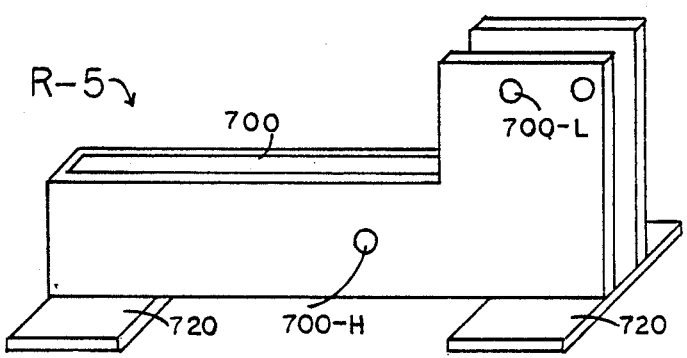
FIG. 4 is a perspective view illustrating part of the road device unit R-5 used in FIGS. 1 and 3.

The axle pin member 770 is inserted into the openings 930 of the wheel holding members 900 (shown in FIGS. 3 and 6) and the motion coordinating openings 700-L of the road device unit R-5 (shown in FIG. 4) in order to join the road device unit R-5 and the bike unit B-3 together, and comprises the motion coordinator means M-5.

This indoor-rollbike apparatus also carries the rider's weight on the wheel member 940 which presses on the rotating road means 710 of the road device unit R-5. As noted above with respect to the embodiment of FIG. 1, by adjusting the horizontal moment arm distance from the seat member 821 to where the wheel holding members 900 are connected to the road device unit R-5, the force of the drive wheel 940 pressing on the road means 710 of the road device unit R-5 can be varied, even to the extent of exceeding the weight of the rider.

It may be noted that in the disclosed embodiments of the apparatus, the bike unit wheel and the frictionally coupled rotatable members of the road device unit can be of durable material, and of suitable weight, to provide a gyroscopic rotational effect. Thus, when the rider stops pedaling, the wheel and rotating road means will continue to rotate for some time to give the feeling of coasting on a real bicycle. Moreover, as the rider transmits a force against the road device related to his/her own weight, the degree of difficulty in rotating the pedals is automatically adjusted somewhat to the weight of the rider. Feedback vibrations are also transmitted to the rider, from the weight supporting wheel rolling on the rotating road means of the road device unit, giving an added degree of realism as in riding a bicycle outdoors. While the above description contains many specifics, the reader should not construe them as limitations on the scope of this invention, but merely as preferred embodiments thereof. Those skilled in the art will readily be able to change the dimensions and shapes of the various embodiments, and build from alternative materials. Accordingly, the scope of the invention is to be determined by the appended claims and their legal equivalents, and not by the examples which have been given.

I claim:

1. A stationary exercise bicycle apparatus, comprising the combination of
    a bike unit having a frame, pedals supported rotatably relative to the frame, a single wheel supported rotatably relative to the frame; drive means connecting the pedal means to the wheel, a seat, and means supporting the seat relative to the frame;
    a road device unit having a stationary frame structure, and a non-powered substantially free-wheeling rotatable means supported to move relative to the frame structure;
    motion coordinator means coupling said bike unit frame relative to the road device unit frame structure, with said wheel frictionally coupled to roll relative to the rotatable means and vertically overlying and supported on the rotatable means;
    said motion coordinator means having pivot means for mounting the bike unit frame relative to the road device unit frame structure at a location rearwardly spaced both from the seat and from the contact region between the wheel and rotatable means, to provide that the bike unit wheel transmits a force against the rotatable means that is related to the weight of the rider sitting on the seat and to the moment arm distances between the pivot means, seat and the contact region, respectively;

whereby the degree of difficulty in having the rider manually move the pedals to rotate the wheel and rotatable means, is automatically varied responsive to the weight of the rider on the bike unit, and whereby the wheel and rotatable means rolling against one another is operable to transmit feedback vibrations to the bike unit frame and seat; and said pivot means being provided with alternative operative positions, effective to change the moment arm distances for selectively increasing or decreasing the force transmitted between the bike unit wheel and rotatable means.

2. A stationary exercise bicycle apparatus according to claim 1, further including said seat support means supporting said seat forwardly spaced from the pivot means at a location so that its moment arm distance from the pivot means is greater than the moment arm distance between the contact region and the pivot means, thereby providing that the transmitted force between the bike unit wheel and rotatable means will be greater than the weight of the rider on the bike unit.

3. A stationary exercise bicycle apparatus, comprising the combination of
   a bike unit having a frame including a main member, pedals supported rotatably relative to the main member, a single wheel supported rotatably relative to the main member, drive means connecting the pedal means to the wheel, a seat, and means supporting the seat relative to the frame;
   a road device unit having a stationary frame structure, and a non-powered substantially free-wheeling rotatable means supported to move relative to the frame structure;
   motion coordinator pivot means coupling said main member to the frame structure, with said bike unit wheel frictionally coupled to roll on the rotatable means and vertically overlying and supported on the rotatable means; said pivot means being at a location rearwardly spaced both from the seat and from the contact region between the wheel and rotatable means, to provide that the bike unit wheel transmits a force against the rotatable means that is related to the weight of the rider sitting on the seat, and to the moment arm distances between the pivot means, seat and contact region, respectively; and
   said seat support means supporting the seat at a moment arm distance from the pivot means greater than the moment arm distance between the contact region and the pivot means, providing that the transmitted force between the bike unit wheel and rotatable means will be greater than the weight of the rider on the bike unit;
   whereby the degree of difficulty in having the rider manually move the pedal means to rotate the wheel and rotatable means, is automatically varied responsive to the weight of the rider on the bike unit, and whereby the wheel and rotatable means rolling against one another is operable to transmit feedback vibrations to the bike unit frame and seat; and
   said pivot means being provided with alternative operative positions, effective to change the moment arm distances for increasing or decreasing the force transmitted between the bike unit wheel and rotatable means.

4. A stationary exercise bicycle apparatus, comprising the combination of
   a bike unit including a frame having a wheel holding member and a main member, and means supporting the main member telescopically from the wheel holding member at any of several different set positions pedals rotatably supported from the frame; a single wheel rotatably supported from the wheel holding member; drive means connecting the pedals to the wheel; a seat, and means supporting the seat relative to the frame;
   a road device unit having a stationary frame structure, and a non-powered substantially free-wheeling rotatable means supported to move relative to the frame structure;
   motion coordinator pivot means coupling said bike unit wheel holding member to the road device unit frame structure, with said bike unit wheel frictionally coupled to roll on the rotatable means and vertically overlying and supported on the rotatable means; said pivot means being at a location rearwardly spaced both from the seat and from the contact region between the wheel and rotatable means, to provide that the bike unit wheel transmits a force against the rotatable means that is related to the weight of the rider sitting on the seat, and to the moment arm distances between the pivot means, seat and contact region, respectively; and
   said seat support means supporting the seat from the main member and at a moment arm distance from the pivot means greater than the moment arm distance between the contact region and the pivot means, providing that the transmitted force between the bike unit wheel and rotatable means will be greater than the weight of the rider on the bike unit; and
   said means supporting the main member from the wheel holding member cooperating telescopically, to allow different operative set positions of the seat relative to the bike unit wheel, to increase or decrease the moment arm distance between the seat and the pivot means and thereby increase or decrease the force transmitted between the bike unit wheel and rotatable means;
   whereby the degree of difficulty in having the rider manually move the pedals to rotate the wheel and rotatable means, is automatically varied responsive to the weight of the rider on the bike unit, and whereby the wheel and rotatable means rolling against one another is operable to transmit feedback vibrations to the bike unit frame and seat.

5. A stationary exercise bicycle apparatus, comprising the combination of
   a bike unit including a frame having a wheel holding member and a main member, and means supporting the main member telescopically from the wheel holding member at any of several different set positions pedals rotatably supported from the frame; a single wheel rotatably supported from the wheel holding member; drive means connecting the pedals to the wheel; a seat, and means supporting the seat relative to the frame;
   a road device unit having a stationary frame structure, and a non-powered substantially free-wheeling rotatable means supported to move relative to the frame structure;

motion coordinator pivot means coupling said bike unit wheel holding member to the road device unit frame structure, with said bike unit wheel frictionally coupled to roll on the rotatable means and vertically overlying and supported on the rotatable means; said pivot means being at a location rearwardly spaced both from the seat and from the contact region between the wheel and rotatable means, to provide that the bike unit wheel transmits a force against the rotatable means that is related to the weight of the rider sitting on the seat, and to the moment arm distances between the pivot means, seat and contact region, respectively; and said seat support means supporting the seat from the main member and at a moment arm distance from the pivot means greater than the moment arm distance between the contact region and the pivot means, providing that the transmitted force between the bike unit wheel and rotatable means will be greater than the weight of the rider on the bike unit;

whereby the degree of difficulty in having the rider manually move the pedals to rotate the wheel and rotatable means, is automatically varied responsive to the weight of the rider on the bike unit, and whereby the wheel and rotatable means rolling against one another is operable to transmit feedback vibrations to the bike unit frame and seat; and said pivot means being provided with alternative operative positions, effective to change the moment arm distances for increasing or decreasing the force transmitted between the wheel and rotatable means.

6. A stationary exercise bicycle apparatus according to claim 5, further including said seat support means supporting the seat from the main member; and said means supporting the main member from the wheel holding member cooperating telescopically, to allow different operative set positions of the seat relative to the bike unit wheel, to increase or decrease the moment arm distance between the seat and the pivot means and thereby increase or decrease the force transmitted between the bike unit wheel and rotatable means.

7. A stationary exercise bicycle apparatus, comprising the combination of a bike unit having a frame, pedals supported rotatably relative to the frame, a single wheel supported rotatably relative to the frame, drive means connecting the pedal means to the wheel, a seat and means supporting the seat relative to the frame, and handlebars and means connecting the handlebars to the frame forwardly of the seat;

a road device unit having a stationary frame structure, and a non-powered substantially free-wheeling rotatable means supported to move relative to the frame structure;

motion coordinator means coupling said bike unit frame relative to the road device unit frame structure, with said wheel frictionally coupled to roll relative to the rotatable means and vertically overlying and supported on the rotatable means; and said motion coordinator means having a single pivot means for mounting the bike unit frame in a horizontally cantilevered manner relative to the road device unit frame structure at a location rearwardly spaced both from the seat and from the contact region between the wheel and rotatable means, to provide that the bike unit frame is generally unsupported forwardly from said contact region and the bike unit wheel transmits a force against the rotatable means that is related to the weight of the rider sitting on the seat and to the moment arm distances between the single pivot means, seat and the contact region, respectively;

whereby the degree of difficulty in having the rider manually move the pedals to rotate the wheel and rotatable means, is automatically varied responsive to the weight of the rider on the bike unit, and whereby the wheel and rotatable means rolling against one another is operable to transmit feedback vibrations to the bike unit frame and seat; and said seat support means including a horizontally disposed member on the frame and a member adapted to cooperate therewith and be adjusted to alternative operative positions for mounting said seat in horizontally different set positions forwardly spaced from the single pivot means, effective to increase or decrease its moment arm distance from the pivot means and thereby increase or decrease the force transmitted between the bike unit wheel and rotatable means.

8. A stationary exercise bicycle apparatus, comprising the combination of a bike unit having a frame, pedals supported rotatably relative to the frame, a single wheel supported rotatably relative to the frame, drive means connecting the pedal means to the wheel, a seat and means supporting the seat relative to the frame, handlebars and means connecting the handlebars to the frame forwardly of the seat;

a road device unit having a stationary frame structure, and a non-powered substantially free-wheeling rotatable means supported to move relative to the frame structure;

motion coordinator means coupling said bike unit frame relative to the road device unit frame structure, with said wheel frictionally coupled to roll relative to the rotatable means and vertically overlying and supported on the rotatable means; and said motion coordinator means having single pivot means for mounting the bike unit frame in a horizontally cantilevered manner relative to the road device unit frame structure at a location rearwardly spaced both from the seat and from the contact region between the wheel and rotatable means, to provide that the bike unit frame is generally unsupported forwardly from said contact region and the bike unit wheel transmits a force against the rotatable means that is related to the weight of the rider sitting on the seat and to the moment arm distances between the single pivot means, seat and the contact region, respectively;

whereby the degree of difficulty in having the rider manually move the pedals to rotate the wheel and rotatable means, is automatically varied responsive to the weight of the rider on the bike unit, and whereby the wheel and rotatable means rolling against one another is operable to transmit feedback vibrations to the bike unit frame and seat; and said seat support means supporting said seat forwardly spaced from the single pivot means at a location so that its moment arm distance from the pivot means is greater than the moment arm distance between the contact region and the single pivot means, thereby providing that the transmitted force between the bike unit wheel and rotatable means will be greater than the weight of the rider on the bike unit.

9. A stationary exercise bicycle apparatus according to claim 8, further including said seat support means including a horizontally disposed member and a member adapted to cooperate therewith and be adjusted to alternative operative positions for mounting said seat in horizontally different set positions forwardly spaced from the pivot means, effective to increase or decrease its moment arm distance from the pivot means and thereby increase or decrease the force transmitted between the bike unit wheel and rotatable means.

10. A stationary exercise bicycle apparatus, comprising the combination of
   a bike unit having a frame including a main member, pedals supported rotatably relative to the main member, a single wheel supported rotatably relative to the main member, drive means connecting the pedal means to the wheel, a seat and means supporting the seat relative to the frame, handlebars and means connecting the handlebars to the frame forwardly of the seat;
   a road device unit having a stationary frame structure, and a non-powered substantially free-wheeling rotatable means supported to move relative to the frame structure; and
   a single motion coordinator pivot means coupling said main member to the frame structure, with said bike unit wheel frictionally coupled to roll on the rotatable means and vertically overlying and supported on the rotatable means; said single pivot means being at a location rearwardly spaced both from the seat and from the contact region between the wheel and rotatable means, to provide that the bike unit frame is generally unsupported forwardly from said contact region and the bike unit wheel transmits a force against the rotatable means that is related to the weight of the rider sitting on the seat, and to the moment arm distances between the single pivot means, seat and contact region, respectively; and said seat support means supporting the seat at a moment arm distance from the single pivot means greater than the moment arm distance between the contact region and the single pivot means, providing that the transmitted force between the bike unit wheel and rotatable means will be greater than the weight of the rider on the bike unit;
   whereby the degree of difficulty in having the rider manually move the pedal means to rotate the wheel and rotatable means, is automatically varied responsive to the weight of the rider on the bike unit, and whereby the wheel and rotatable means rolling against one another is operable to transmit feedback vibrations to the bike unit frame and seat.

11. A stationary exercise bicycle apparatus according to claim 10, further including said seat support means including a horizontally disposed member and a member adapted to cooperate therewith and be adjusted to alternative operative positions for mounting said seat in horizontally different set positions forwardly spaced from the pivot means, effective to increase or decrease its moment arm distance from the pivot means and thereby increase or decrease the force transmitted between the bike unit wheel and rotatable means.

12. A stationary exercise bicycle apparatus, comprising the combination of
   a bike unit having a wheel holding member and a main member; pedals rotatably supported from the main member; a single wheel rotatably supported from the wheel holding member; drive means connecting the pedals to the wheel; a seat, and means supporting the seat relative to the main member;
   a road device unit having a stationary frame structure, and a non-powered substantially free-wheeling rotatable means supported to move relative to the frame structure;
   motion coordinator pivot means coupling said bike unit wheel holding member to the road device unit frame structure, with said bike unit wheel frictionally coupled to roll on the rotatable means and vertically overlying and supported on the rotatable means, and with said pivot means and wheel forming the sole support of the bike unit; said pivot means being rearwardly spaced both from the seat and from the wheel-rotatable means contact region to provide that the bike unit wheel transmits a force against the rotatable means that is related to the weight of the rider sitting on the seat, and to the moment arm distances between the pivot means, seat and contact region, respectively; and
   means supporting the main member telescopically from the wheel holding member at any of several different set positions, to provide that the moment arm distances may be adjusted to increase or decrease the wheel force against the rotatable means;
   whereby the degree of difficulty in having the rider manually move the pedals to rotate the wheel and rotatable means can be varied by adjustment of the moment arm distances, but when set is automatically responsive to the rider's weight.

13. A stationary exercise bicycle apparatus according to claim 12, further including said seat support means being provided with alternative operative positions for mounting said seat in horizontally different set positions forwardly spaced from the pivot means, effective also to adjustably set the moment arm distances to increase or decrease the wheel force against rotatable means.

* * * * *